(12) United States Patent
Cristallo et al.

(10) Patent No.: US 10,148,742 B2
(45) Date of Patent: Dec. 4, 2018

(54) SYSTEM AND METHOD FOR AN IMPROVED HIGH AVAILABILITY COMPONENT IMPLEMENTATION

(75) Inventors: Geoffrey Cristallo, Molenbeek (BE); Nico Janssens, Overmere (BE); Johan Marie Camiel Moreels, Strijtem (BE)

(73) Assignee: Alcatel Lucent, Paris (FR)

( * ) Notice: Subject to any disclaimer, the term of this patent is extended or adjusted under 35 U.S.C. 154(b) by 589 days.

(21) Appl. No.: 12/276,719

(22) Filed: Nov. 24, 2008

(65) Prior Publication Data
US 2009/0138615 A1    May 28, 2009

(30) Foreign Application Priority Data

Nov. 28, 2007   (EP) ..................... 07291417

(51) Int. Cl.
| | |
|---|---|
| *G06F 15/173* | (2006.01) |
| *H04L 29/08* | (2006.01) |
| *G06F 9/54* | (2006.01) |
| *G06F 11/20* | (2006.01) |
| *H04L 29/14* | (2006.01) |

(52) U.S. Cl.
CPC .......... *H04L 67/1006* (2013.01); *G06F 9/548* (2013.01); *G06F 11/2025* (2013.01); *G06F 11/2035* (2013.01); *H04L 67/1017* (2013.01); *H04L 67/1019* (2013.01); *H04L 67/1023* (2013.01); *H04L 67/14* (2013.01); *H04L 69/40* (2013.01); *H04L 67/1002* (2013.01)

(58) Field of Classification Search
CPC .. H04L 47/10; H04L 47/2433; H04L 65/1006
USPC ....... 709/251, 235, 230, 229, 226, 224, 223, 709/208, 244, 228, 227, 225, 219, 203, 709/200, 236, 206, 205, 390, 389; 714/6, 714/50, 4, 26, 11, 1; 370/432, 401, 360, 370/352, 338, 252, 242, 241, 235, 228, 370/217, 422, 392, 396, 395.4, 390, 389, 370/351; 718/105, 101
See application file for complete search history.

(56) References Cited

U.S. PATENT DOCUMENTS 6,363,421 B2 * 3/2002 Barker ................ H04L 41/0213
                                                         709/202
6,775,280 B1 * 8/2004 Ma ......................... H04L 45/00
                                                          370/230

(Continued)

FOREIGN PATENT DOCUMENTS

WO    WO 00/45298 A2    8/2000

OTHER PUBLICATIONS

European Search Report.

*Primary Examiner* — Dhairya A Patel
(74) *Attorney, Agent, or Firm* — Fay Sharpe LLP

(57) ABSTRACT

The invention relates to a computer system and method for high availability processing through a session on a transport connection, for use in a cluster with at least two nodes. The system comprises a protocol component; a cluster with at least two nodes, said cluster being arranged for running the protocol component; and a server arranged for maintaining a protocol session on a transport connection with a node of the cluster. The cluster is arranged for maintaining on each of said at least two nodes one instance of the protocol component, so that at least two instances are active; the server is arranged for simultaneously maintaining a protocol session with each instance.

22 Claims, 4 Drawing Sheets

(56) References Cited

U.S. PATENT DOCUMENTS

Figure 1:
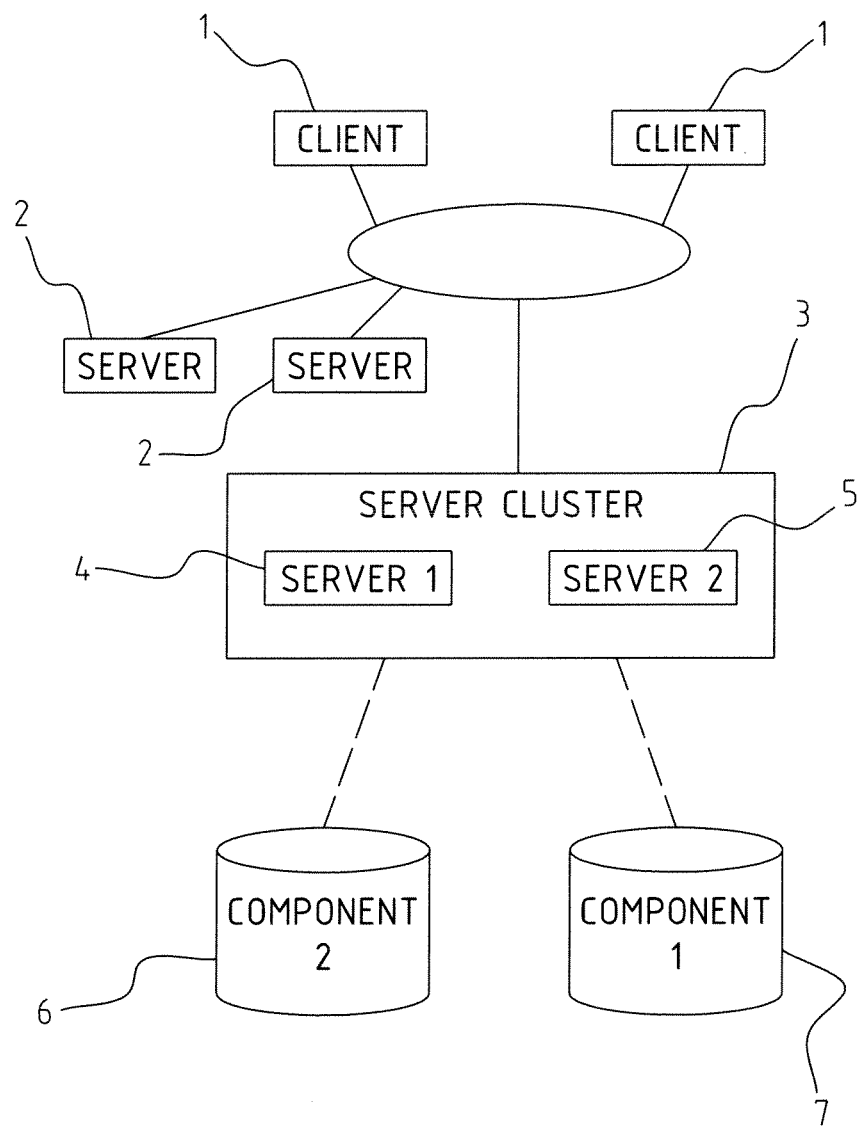

| | | | |
|---|---|---|---|
| 6,778,495 B1* | 8/2004 | Blair | H04L 45/245 |
| | | | 370/230 |
| 7,483,992 B2* | 1/2009 | Bahl | 709/228 |
| 2003/0014480 A1 | 1/2003 | Pullara et al. | |
| 2003/0063611 A1* | 4/2003 | Schaub et al. | 370/395.32 |
| 2005/0198648 A1* | 9/2005 | Wray | G06F 9/45512 |
| | | | 719/317 |
| 2006/0168274 A1* | 7/2006 | Aloni et al. | 709/230 |
| 2006/0256803 A1* | 11/2006 | Nakata | H04L 1/1642 |
| | | | 370/412 |
| 2007/0091874 A1* | 4/2007 | Rockel | G06Q 30/04 |
| | | | 370/352 |
| 2008/0075261 A1* | 3/2008 | Ramanathan | H04L 65/1006 |
| | | | 379/220.01 |
| 2008/0155552 A1* | 6/2008 | Kim | G06F 9/505 |
| | | | 718/105 |
| 2008/0163312 A1* | 7/2008 | Faust | H04N 7/163 |
| | | | 725/93 |

* cited by examiner

SYSTEM AND METHOD FOR AN IMPROVED HIGH AVAILABILITY COMPONENT IMPLEMENTATION

The present invention relates to a system for high availability processing, comprising a protocol component, a cluster with at least two nodes, said cluster being arranged for running the protocol component, and a server arranged for maintaining a protocol session on a transport connection, such as a TCP connection, with a node of the cluster. The invention also relates to a method for high availability processing through a protocol session on a transport connection.

As applications requiring higher reliability and low down time increase, there is a great interest in fault tolerant and high availability processing systems. One known solution implies a network which interconnects cluster groups of processors. A cluster is based on the principle of hardware redundancy and typically consists of a plurality of nodes managed as a single system for increased availability.

The most common size for a high availability cluster is two nodes, for example a master node and a backup node. At present when vendors claim that the component implementation is highly available, they mean that the component runs in a clustered environment and that one instance of the component maintains a protocol session with the server. The master component is typically backed up by a backup component, working off line as long as the master component is up and running, but becoming available when the master component fails. In other words, current "high availability" architectures consist of several instances of the component (The master component and one or more backup components) buy only a single protocol session between the master component and the server. If the master component fails, a new protocol session needs to be opened between the server and the backup component. Hence the server will perceive a period of unavailability of the service. In fact, the processing burden on the component and the probability that it fails are not reduced. Indeed, assisting the component by a backup component does not decrease the processing burden on the component. The probability that the component becomes unavailable is just the same with or without the backup component. Moreover the processing burden on the backup component is usually close to the processing burden on the master component, so that the total processing burden of the solution amounts to almost twice the processing burden of a single component.

The object of the invention is to provide a high available component implementation based on a transport connection decreasing the processing burden on the component and configurable to decrease the load on the available resources, and hence reducing the probability of a crash and/or failure of an instance of the component.

To reach this object the system according to the invention is distinguished in that the cluster is arranged for maintaining on each of said at least two nodes one instance of the protocol component, so that at least two instances are active, and in that the server is arranged for simultaneously maintaining a protocol session with each instance. The problems of the prior art are further solved by the method of the invention which is basically characterized by distributing a protocol component over at least two nodes, one instance of the same protocol component running on each node, and transport connections with this protocol component.

The system and method of the invention have the advantage that the protocol can benefit from real load-balancing mechanisms by decreasing the processing burden on the protocol component since the protocol component is distributed over at least two nodes, and the traffic to these nodes can be adjusted appropriately on a continuous basis since the at least two protocol sessions remain active.

Note that the term "protocol session" has to be interpreted in a broad sense and refers to any long lasting connection on a transport connection, such as a XMPP session over TCP (Transmission Control Protocol) connection, but also including for example the Diameter protocol connection over a TCP or SCTP (Stream Control Transmission Protocol) connection. In principle, any other protocol which uses protocol sessions and is suitable for use on a transport connection is envisaged by the present invention.

Advantageous embodiments are disclosed in the dependent claims.

Preferably the system is arranged for re-assigning traffic sent on a protocol session with a failing instance to a different active protocol session. In that way a permanent availability is ensured.

According to a preferred embodiment the server is provided with a module for assigning protocol packets alternatively to each of the plurality of instances according to a predetermined algorithm. The module typically has access to a list of the active protocol sessions with the protocol component, and the server is arranged for delivering protocol packets to the module which sends these packets according to the predetermined algorithm. The skilled person will understand that many different algorithms are possible such as a round-robin method, a hash method, an at random method, a fixed assignment method, a method based on the session identifier, a combination of one or more of said methods, etc. These methods will be further elucidated with reference to FIG. 4.

According to a different aspect of the method of the invention, the server measures the processing load on each instance of the protocol component, wherein the assignment of the protocol packets is based on the processing load measurements. In that way a very efficient load-balancing can be performed between the instances.

Figure 2A:
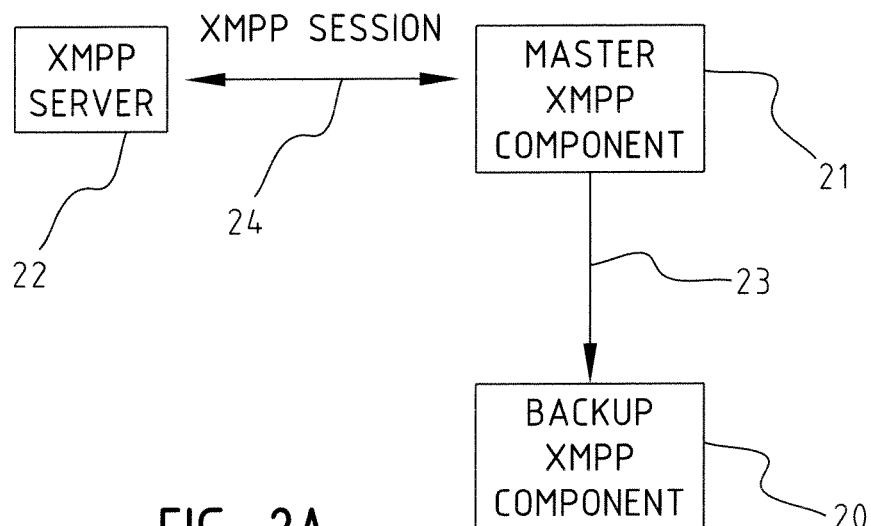
Figure 2B:
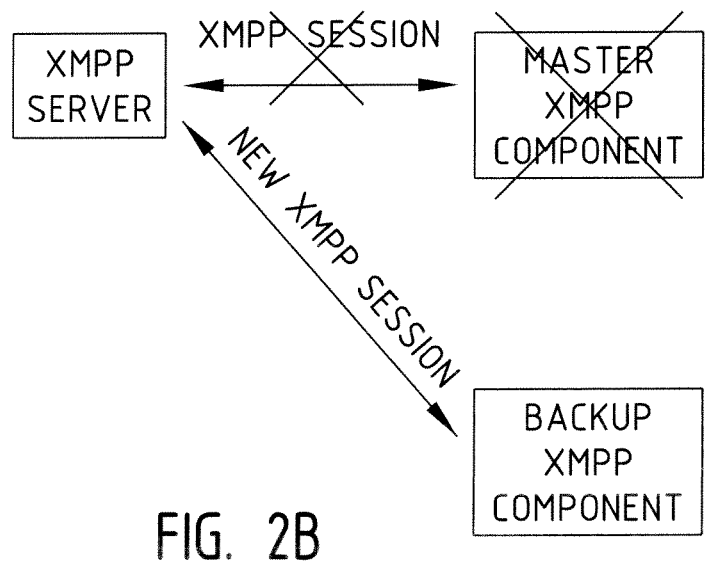
Figure 3A:
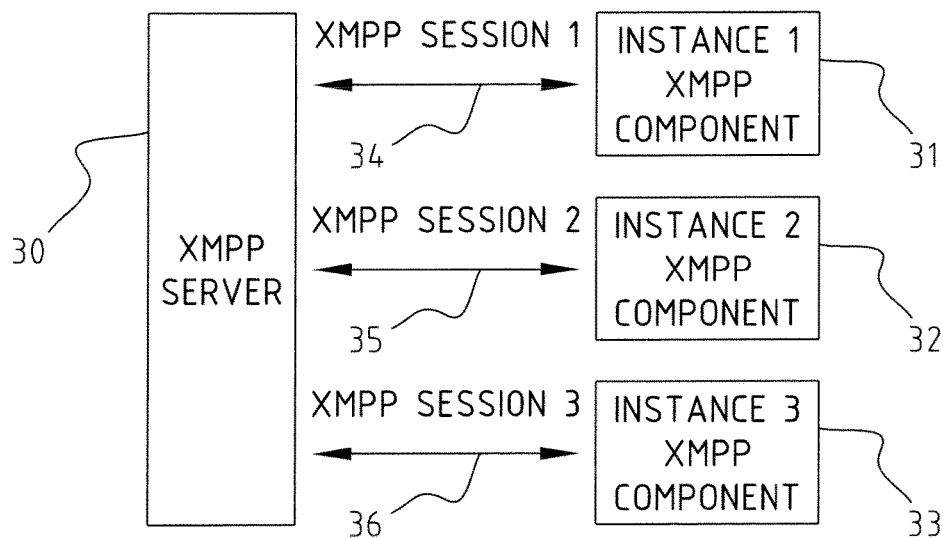
Figure 3B:
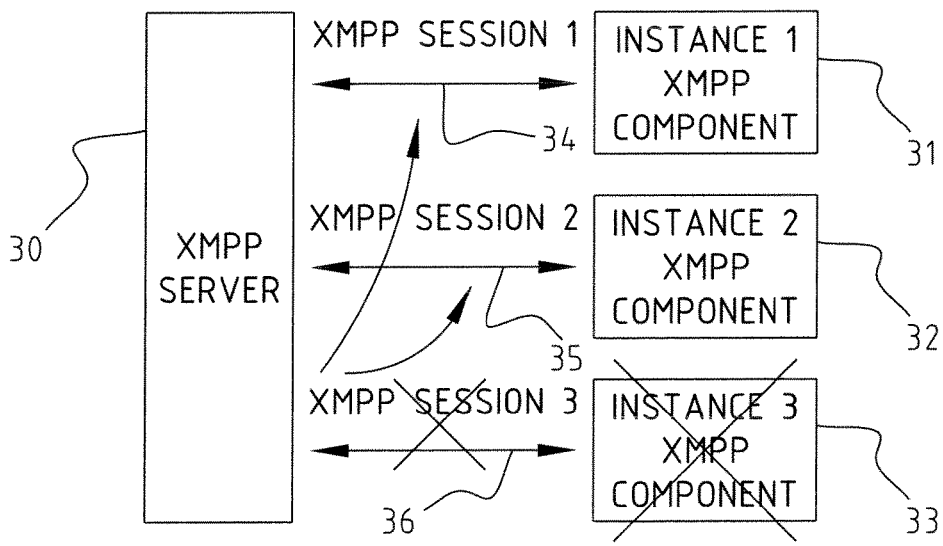
Figure 4:
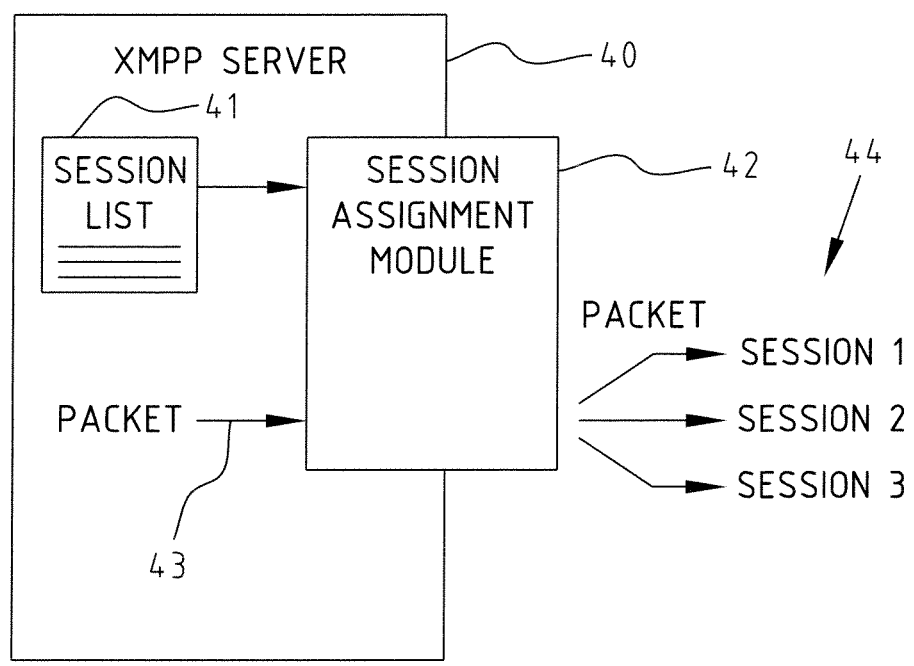

The accompanying drawings are used to illustrate presently preferred non-limiting exemplary embodiments of the present invention. The above and other advantages features and objects of the invention will become more apparent and the invention will be better understood from the following detailed description when read in conjunction with accompanying drawings in which:

FIG. 1 shows an example of a typical computer network in which the system and method of the invention may be implemented;

FIGS. 2(A)-(B) illustrate schematically the high availability implementation of the prior art;

FIGS. 3(A)-(B) illustrate schematically an embodiment of the system and method of the present invention;

FIG. 4 is a schematic representation of an XMPP server arranged for use in the system and method of the invention.

FIG. 1 illustrates a typical computer system with a number of clients 1, a number of servers 2, and a server cluster 3 consisting of a first server 4 and a second server 5. Note that a server cluster 3 typically consists of a number of server instances or processes which can run on the same machine or can be located on different machines. The server instances of a server cluster are arranged for running a number of components 6, 7.

FIG. 2 illustrates a method of the prior art used by XMPP (Extensible Messaging and Presence Protocol) component vendors with a so called highly available XMPP component implementation. XMPP is a protocol for streaming XML elements in order to exchange messages and present information close to real time. The XMPP workgroup of the IETF further adapted the Jabber protocols as an IETF-approved Instant Messaging (IM) and Presence technology. The protocols contributed were RFC3920 (XMPP Core) available from http://www.iet.org/rfc/rfc3920.txt and RFC3921 (IM and Presence Extensions to XMPP core) available from http://www.ietf.org/rfc/rfc3921.txt, which RFC texts are incorporated by reference herein. In addition to that the Jabber community manages jabber extension protocols (XEPs).

XMPP enables trusted components to connect to XMPP servers wherein the XMPP server and XMPP component maintain one or several XMPP sessions with each other. Such a session is established upon a transport connection, in particular a TCP connection. The message session is carried as a stream of XML stanzas over the TCP connection.

As illustrated in FIG. 2(A), the high availability implementation of the prior art consists in using a backup XMPP component 20 for taking over if the master XMPP component 21 fails. For running an XMPP component, the XMPP server 22 maintains only a single session with the master component 21. The backup component 20 works off-line as long as the master component 21 is up and running. In this situation, the backup component replicates all required configuration and/or real-time information from the master component 21, so that in case the master component becomes unavailable, the backup components can take over immediately, as illustrated in FIG. 2(B). However, due to the lacking of an XMPP session being present and the necessity to open a new session between the XMPP server and the backup component, the user will perceive a period of unavailability of the service.

The main idea of the present invention is that next to providing backup components, backup protocol sessions are provided between the server on the one side and the component and backup components on the other side.

A possible embodiment of this concept is illustrated in FIGS. 3(A) and 3(B). In this example an XMPP protocol is used. However the skilled person will understand that the illustrated system and method can also be implemented in any other protocol carried on a transport connection, typically using TCP. An example of an alternative for XMPP is Diameter. The Diameter base protocol is intended to provide an Authentication, Authorization and Accounting (AAA) framework for applications such as network access or IP mobility, and is defined in RFC3588 available from http://www.ietf.org/rfc/rfc3588.txt In the example of FIG. 3(A), the XMPP component is distributed over a cluster of three nodes. On each node there is one instance 31, 32, 33 of the same XMPP component, and each instance 31, 32, 33 maintains a single XMPP session 34, 35, 36 with the server 30. All the instance 31-33 and their corresponding sessions 34-36 are simultaneously active, so that the traffic can effectively be split over all the XMPP sessions. In other words the total processing burden of the same XMPP component can be evenly distributed over the different instances which are active in the cluster. In case of such an even distribution, the processing burden of each instance of a cluster of n nodes will be approximately divided by a factor n.

However, the skilled person will understand that in some systems it may be preferable to have a non-even distribution. This will for example be the case if one component has more processing capacity available than another component. According to a possible variant the server could be arranged to measure the load of each component, and the splitting of the traffic could be based on such load measurements. This will be further discussed below with reference to FIG. 4.

If one of the instances, for example instance 3 in FIG. 3(B), fails, the traffic sent on session 3 is automatically re-assigned to session 1 and/or session 2.

The assignment of the traffic towards the different protocol sessions which are simultaneously active in the cluster, and the automatic re-assignment in case of failure can be done by a special module provided in the server. An embodiment of such a protocol session assignment module, also called Fault Tolerance (FT) module, will now be illustrated with reference to FIG. 4.

According to this embodiment the FT module 42 is implemented in the XMPP server 40 and is responsible for determining how to split the traffic destined for the XMPP component among the set of available XMPP sessions, typically opened on top of one or several TCP connections.

Upon opening of a set of XMPP sessions with the same component the XMPP server 40 will notify the FT module of a list 41 of established XMPP sessions which are typically identified with a Session ID. When a packet has to be forwarded to the XMPP component, the FT module will decide which XMPP session to use and will send the packet accordingly. Different algorithms may be used such as:

- the round-robin method wherein each XMPP session is used in turn. The FT module remembers the last Session ID (or a variable related therewith) and sends the next packet to the next session identified by the next Session ID. Such an algorithm will be useful when there are many components and has the advantage of being very simple to implement.
- the hash-method: the FT module first selects a key by performing a hash (e.g. CRC16) over some fields in the XMPP Packet that identify a "flow" (e.g. the "to" and "from" attributes coupled with the "Thread ID" (if any)). Each Session ID is assigned unique regions in the key space. The FT module uses the key to determine the Session ID on which a packet needs to be sent. Such an algorithm will be especially suitable if a dedicated component needs to be picked up, but is more complicated.
- a combination of the hash method with the round-robin method or any other simple algorithm: if the hash method returns a list of possible components, than another method will have to be used to make a decision, this could for example be the round-robin method or one of the other methods listed below.
- a load-based method: the server can be arranged to obtain information on the processing load on each component. The packets could then be sent to the session of the component with the lowest load.
- an "at random" method sending the packets to "any" component at random.
- an "always the same" method wherein certain packets are always sent on the same session.
- a method based on the identifier, for example sending the packets to the component with the lowest identifier, etc.

While the principles of the invention have been set out above in connection with specific embodiments, it is to be clearly understood that this description is merely made by way of example and not as a limitation of the scope of protection which is determined by the appended claims.

The invention claimed is:

1. Computer system for high availability processing at an application level, the computer system comprising:

a signaling protocol component that uses signaling protocol sessions and is carried out on a transport connection;

a cluster with at least two nodes, said cluster being arranged for running the signaling protocol component; and a server arranged for maintaining a protocol session on a transport connection with a node of the cluster, wherein the cluster is arranged for maintaining on each of said at least two nodes one instance of the signaling protocol component, so that at least two instances are active; and that the server is arranged for simultaneously maintaining a signaling protocol session with each of said at least two instances, wherein the server is configured to measure the processing load on each instance of the protocol component, and further configured to assign the protocol packets based on the processing load measurements.

2. Computer system according to claim 1, wherein the system is further arranged for re-assigning traffic sent on a signaling protocol session with a failing instance of the at least two instances to a different signaling protocol session maintained with another instance of the at least two instances.

3. Computer system according to claim 1, wherein the protocol sessions on the transport connection use XMPP.

4. Computer system according to claim 1, wherein the server is provided with a module for assigning protocol packets alternatively to each of the plurality of instance according to a predetermined algorithm.

5. Computer system according to claim 4, wherein the module has access to a list of the active protocol sessions with the protocol component, and that the server is arranged for delivering protocol packets to the module.

6. Computer system according to claim 1, wherein the algorithm comprises a fixed assignment method.

7. Computer system according to claim 6, wherein the fixed assignment method comprises nearly always sending certain packets on the same session.

8. Computer system according to claim 1, wherein protocol packets are assigned to an instance of the signaling protocol session based on a determined algorithm and the algorithm comprises at least one of the following algorithms: an at random method, or a combination of a hash method with a round-robin method.

9. Method for high availability processing through a session on a transport connection at an application level, for use in a cluster with at least two nodes, said cluster being arranged for running a signaling protocol component that uses signaling protocol sessions and is carried out on a transport connection;

wherein a signaling protocol component is distributed over at least two of the at least two nodes, one instance of the same signaling protocol component running on each node, a server opens at least two signaling protocol sessions on one or more transport connections to this protocol component, so that a signaling protocol session with each instance is maintained simultaneously, and the server measures the processing load on each instance of the protocol component, and that the assignment of the protocol packets is based on the processing load measurements.

10. Method according to claim 9, wherein protocol packets are assigned to the at least two protocol sessions based on a determined algorithm and the algorithm comprises at least one of the following algorithms: an at random method, or a combination of a hash method with a round-robin method.

11. Method according to claim 10, wherein the algorithm comprises a fixed assignment method.

12. Method according to claim 11, wherein the fixed assignment method comprises nearly always sending certain packets on the same session.

13. Method according to claim 9, wherein protocol packets sent on a protocol session of the at least two protocol sessions to a failing instance of the at least two instances are re-assigned to a different protocol session of the at least two protocol sessions.

14. A computer system for high availability processing, the computer system comprising:

a signaling protocol component that uses signaling protocol sessions and is carried out on a transport connection at an application level;

a cluster with at least two nodes, wherein the cluster is configured to run the signaling protocol component;

a server that is configured to maintain a protocol session on a transport connection with a node of the cluster, wherein the cluster is configured to maintain on each of said at least two nodes one instance of the signaling protocol component, so that at least two instances are active; and that the server is configured to simultaneously maintain a signaling protocol session with each of said at least two instances; and wherein the server is further configured to measure the processing load on each instance of the protocol component; and wherein the system further comprises a fault tolerance module that is configured to assign protocol packets alternatively to each of the plurality of instances according to a predetermined algorithm, wherein the predetermined algorithm comprises a load based method.

15. The computer system according to claim 14, wherein the system is further configured to re-assign traffic sent on a signaling protocol session with a failing instance of the at least two instances to a different signaling protocol session maintained with another instance of the at least two instances.

16. The computer system according to claim 14, wherein the protocol sessions on the transport connection use Extensible Messaging and Presence Protocol (XMPP).

17. The computer system according to claim 14, wherein the fault tolerance module has access to a list of the active protocol sessions with the protocol component, and the server is arranged for delivering protocol packets to the module.

18. The computer system according to claim 14, wherein the load-based method comprises sending the data packet to a session of the signaling protocol component with the lowest load.

19. The computer system according to claim 14, wherein the predetermined algorithm comprises a hash method and the fault tolerance module is configured to select a key by performing a hash over a plurality of fields in a data packet that identify a flow and use the key to determine one of a list of signaling protocol sessions to which the data packet needs to be sent.

20. The computer system according to claim 14, wherein the algorithm comprises a fixed assignment method.

21. The computer system according to claim 20, wherein the fixed assignment method comprises nearly always sending certain packets on the same session.

22. The computer system according to claim 14, wherein the fault tolerance module is configured to assign protocol packets alternatively to each of the plurality of instances according to a predetermined algorithm, and wherein the predetermined algorithm comprises at least one of the following algorithms: an at random method, or a combination of a hash method with a round-robin method.

\* \* \* \* \*